(12) United States Patent
Vosburgh et al.

(10) Patent No.: US 12,560,410 B1
(45) Date of Patent: *Feb. 24, 2026

(54) DEVICES, SYSTEMS, AND METHODS FOR COUNTERING DRONE COUNTERMEASURES

(71) Applicant: Archaius Inc., Durham, NC (US)

(72) Inventors: Frederick Vosburgh, Durham, NC (US); Kristopher McGuire, Raleigh, NC (US); Lee B. Baker, Raleigh, NC (US)

(73) Assignee: Archaius Inc., Durham, NC (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/244,942

(22) Filed: Sep. 12, 2023

Related U.S. Application Data

(63) Continuation-in-part of application No. 18/238,152, filed on Aug. 25, 2023, which is a
(Continued)

(51) Int. Cl.
| | |
|---|---|
| *G07C 5/00* | (2006.01) |
| *F41G 7/22* | (2006.01) |
| *G01S 3/48* | (2006.01) |
| *G07C 5/02* | (2006.01) |
| *G07C 5/04* | (2006.01) |
| *G07C 5/08* | (2006.01) |
(Continued)

(52) U.S. Cl.
CPC .............. *F41G 7/2253* (2013.01); *G01S 3/48* (2013.01); *B64U 10/00* (2023.01); *B64U 2101/15* (2023.01); *G01S 19/21* (2013.01)

(58) Field of Classification Search
CPC .......... F41G 7/2253; G01S 3/48; G01S 19/21; B64U 10/00; B64U 2101/15
See application file for complete search history.

(56) References Cited

U.S. PATENT DOCUMENTS

| | | | |
|---|---|---|---|
| 3,964,065 A | | 6/1976 | Roberts et al. |
| 5,355,767 A | * | 10/1994 | Morita ...................... F41G 3/14 |
| | | | 342/419 |

(Continued)

FOREIGN PATENT DOCUMENTS

| | | |
|---|---|---|
| CN | 204856097 U | 12/2015 |
| CN | 111707447 A | 9/2020 |

(Continued)

OTHER PUBLICATIONS

Gangil Byun, Hosung Choo, and Sunwoo Kim, "Improvement of Pattern Null Depth and Width Using a Curved Array With Two Subarrays for CRPA Systems", IEEE Transactions on Antennas and Propagation, vol. 63, No. 6, Jun. 2015, pp. 2824-2827.
(Continued)

*Primary Examiner* — Kito R Robinson
*Assistant Examiner* — Anthony Gabriel Mora
(74) *Attorney, Agent, or Firm* — NEO IP

(57) ABSTRACT

A navigation system and method for guiding a vehicle with respect to a source of jamming is disclosed, the system and method being capable of receiving navigation-aid signals, detecting jamming of such signals, mitigating such jamming, determining direction to the source of jamming, and interdicting that source, e.g., a drone gun.

14 Claims, 6 Drawing Sheets

100a

100b

Related U.S. Application Data continuation-in-part of application No. 18/222,184, filed on Jul. 14, 2023, now Pat. No. 12,339,392.

(60) Provisional application No. 63/447,771, filed on Feb. 23, 2023.

(51) Int. Cl.

| | |
|---|---|
| *B64U 10/00* | (2023.01) |
| *B64U 101/15* | (2023.01) |
| *G01S 19/21* | (2010.01) |

(56) References Cited

U.S. PATENT DOCUMENTS

| | | | |
|---|---|---|---|
| 5,440,308 | A | 8/1995 | Dybdal et al. |
| 5,440,636 | A | 8/1995 | Herrick |
| 6,590,528 | B1 | 7/2003 | DeWulf |
| 6,847,328 | B1 * | 1/2005 | Libonati ............... H01Q 9/0407 |
| | | | 343/797 |
| 6,861,983 | B2 | 3/2005 | Casabona et al. |
| H2224 | H | 10/2008 | Madden |
| 7,733,288 | B2 | 6/2010 | Williams |
| 8,125,398 | B1 | 2/2012 | Paulsen |
| 8,965,319 | B2 | 2/2015 | Wilkerson et al. |
| 9,519,062 | B2 | 12/2016 | Vosburgh et al. |
| 10,330,769 | B1 | 6/2019 | Mayer et al. |
| 10,581,155 | B1 | 3/2020 | Gradinaru et al. |
| 10,735,037 | B2 | 8/2020 | Floyd et al. |
| 10,868,609 | B1 * | 12/2020 | Kossin ..................... H04B 7/10 |
| 10,922,982 | B2 | 2/2021 | Magdaleno |
| 2002/0015439 | A1 | 2/2002 | Kohli et al. |
| 2003/0031279 | A1 | 2/2003 | Blount et al. |
| 2010/0007555 | A1 | 1/2010 | Ezal et al. |
| 2010/0045506 | A1 * | 2/2010 | Law ......................... G01S 19/21 |
| | | | 342/13 |
| 2012/0252392 | A1 | 10/2012 | Wilkerson et al. |
| 2014/0152499 | A1 * | 6/2014 | Vosburgh ............... H01Q 21/28 |
| | | | 342/357.59 |
| 2015/0349432 | A1 | 12/2015 | Vosburgh |
| 2016/0349375 | A1 * | 12/2016 | Littlefield ................. G01S 5/06 |
| 2017/0261999 | A1 * | 9/2017 | Van Voorst .............. G08G 5/22 |
| 2017/0293265 | A1 | 10/2017 | Salle et al. |
| 2018/0375487 | A1 | 12/2018 | Chen et al. |
| 2019/0259280 | A1 | 8/2019 | Lamkin et al. |
| 2019/0372725 | A1 | 12/2019 | Hongo |
| 2020/0005656 | A1 | 1/2020 | Saunamaeki |
| 2020/0102074 | A1 | 4/2020 | Kinsley et al. |
| 2020/0169287 | A1 * | 5/2020 | Kim ....................... H04B 1/525 |
| 2021/0018936 | A1 * | 1/2021 | Di Pietro ................. H04K 3/22 |
| 2021/0173036 | A1 | 6/2021 | Guezelarslan et al. |
| 2021/0248488 | A1 | 8/2021 | Naseef |
| 2022/0014205 | A1 | 1/2022 | Petrov et al. |
| 2022/0163676 | A1 | 5/2022 | Amarnathan |
| 2022/0285845 | A1 | 9/2022 | Panther et al. |
| 2022/0324572 | A1 | 10/2022 | Alzahrani |
| 2022/0397375 | A1 * | 12/2022 | Hyman .................. H04K 3/224 |
| 2025/0116488 | A1 * | 4/2025 | Branco Ferreira ...... H04K 3/90 |

FOREIGN PATENT DOCUMENTS

| | | |
|---|---|---|
| KR | 20170070816 A | 6/2017 |
| KR | 102428558 B1 | 8/2022 |

OTHER PUBLICATIONS

Sidney P. Applebaum, "Adaptive Arrays", IEEE Transactions on Anennas and Propagation, vol. AP-24, KO. 5, Sep. 1976, pp. 585-598.

U.S. Appl. No. 18/222,184, filed Jul. 14, 2023, titled "Devices, Systems, and Methods for Cancellation Bandwidth—Adjustable Nulling of Interference".

U.S. Appl. No. 18/238,152, filed Aug. 25, 2023, titled "Devices, Systems, and Methods for Countering Drone Countermeasures".

18222184_Dec. 9, 2024_CN_111707447 A_M.pdf, machine translation of CN-111707447-A (Year: 2020).

18222184_Dec. 10, 2024_KR_20170070816_A_M.pdf, machine translation of KR-20170070816-A (Year: 2016).

\* cited by examiner

100b →

100a →

DEVICES, SYSTEMS, AND METHODS FOR COUNTERING DRONE COUNTERMEASURES

CROSS-REFERENCE TO RELATED APPLICATIONS

This application is related to and claims priority from the following US patents and patent applications: this application is a continuation-in-part of U.S. patent application Ser. No. 18/238,152, filed Aug. 25, 2023, which is a continuation-in-part of U.S. patent application Ser. No. 18/222,184, filed Jul. 14, 2023, which claims priority from and the benefit of U.S. Provisional Patent Application No. 63/447,771, filed Feb. 23, 2023. Each of the above applications is incorporated herein reference in its entirety.

BACKGROUND OF THE INVENTION

1. Field of the Invention

This disclosure relates to guided vehicles and their navigation systems. More specifically, it relates to vehicle with navigation systems that are operable to mitigate jamming and interdict its source.

2. Description of the Prior Art

The introduction of GPS guidance in the late 1980's transformed warfare. Today, warfare is being fundamentally changed again by the emergence of unmanned or remotely piloted vehicles (hereinafter drones) as inexpensive platforms for intelligence, surveillance and reconnaissance (ISR) and of mobile jamming devices referred to as drone guns, which have proven quite effective in defeating drones by disrupting their reception of GPS and command and control signals, causing them to crash.

While larger vehicles can afford the high size weight power (SWAP) and cost burdens of controlled radiation pattern array (CRPA) antennas, quadcopters and other drones typically cannot, exposing them to a punishing rate of attrition on the battlefield, often at the hands of portable drone counter-measures known as drone guns.

CRPA create nulls that are wide in the spatial domain and narrow in the spectral domain, both of which reduce their performance. Broad spatial nulls are indiscriminate, cancelling signals of interest (SOI) over a wide area of the sky around a source of jamming. That also limits their ability to determine the direction to a jammer. And, CRPA nulls, despite efforts to expand their spectral width (e.g., in "Improvement of Pattern Null Depth and Width Using a Curved Array with Two Subarrays for CRPA Systems" by Byun et al. (2015)), are unacceptably narrow in an era of broadband signals like GPS M-Code and Wi-Fi among other signals needing broadband defense.

Ground attack missiles can afford the SWAP and cost of GPS anti-jamming antennas, but the predictable loss of guidance to jamming drives a requirement for terminal homing signals, e.g., a radar or laser reflection from the target, without which accurate delivery on target is uncertain. While missiles could, in principle, be used against drone guns, their high cost makes it impractical.

U.S. Pat. No. 8,125,398 by Paulsen discloses GPS-guided artillery shells having a nose-mounted forward-looking antenna and a circumferentially exposed slot antenna aft of the nose. The nose mounted antenna is omni-directional and therefore immune to amplitude variation caused by rotation of the shell in flight. The slot antenna has a gain pattern that does not overlap that of the nose-mounted antenna, and has an on-axis phase center for receiving signals without rotation-induced modulation of amplitude or phase of the received signal induced by spinning of the shell, but neither antenna defends against jamming. Paulsen also teaches aft-looking reception of remote-control signals. In any case, neither antenna provides protection against jamming.

U.S. Pat. No. 6,861,983 disclosed by Casabona et al describes methods and apparatus for improving reception of GPS signals by vehicles subject to pitch or roll while traveling on uneven ground by combining signals from two orthogonally oriented antennas to maintain received signal strength to compensate for the effect of rolling.

U.S. Pat. No. 7,733,288 by Williams discloses the use of antennas arranged between a receive antenna and source of interference, such as a co-site transmitting antenna, to selectively absorb the transmission, thereby improving the relative strength of desirably received signals.

U.S. Pat. No. 10,735,037 for tunable filters, cancellers, and duplexers by Floyd, et al., teaches use of passive mixers to cancel self-interference of wireless transmit signals that couple into a receive antenna, thereby interfering with reception of SOI such as mobile phone signals. The disclosed method uses a copy of the transmit signal, including distortion generated by the power amplifier, which is compensated and combined with the received signal to selectively cancel the transmit signals including its distortion.

U.S. Pat. No. 8,965,319 by Wilkerson at al. (2015) discloses methods and devices for reducing radio frequency interference by deterministic, feed-forward cancellation of even saturating jamming signals to selectively isolate radio frequency (RF) signals of interest (SOI). The disclosed method also includes the finding of the direction to a source of jamming superior to other anti-jamming antennas.

U.S. Pat. No. 9,519,062 by Vosburgh et al discloses devices and methods for cancelling in-band interference of global positioning system (GPS) signals using evanescent fields to cancel jamming before it enters the receive antenna vs. canceling it after the fact. While this invention provides deep nulls, time delay due to the system design and component limitations result in a narrow cancellation bandwidth, limiting its effectiveness against wideband interference.

Given the importance of drones and the ubiquity of drone guns on the battlefield, we propose drones having a navigation system that allows them to navigate by GPS or remote-control, to defeat jamming of such signals, and to navigate, such as homing, even in the face of disruptive jamming to interdict a drone gun or other sources of jamming, providing a low cost/high value vehicle that addresses emerging requirements of modern warfare.

The current disclosure of cancellation provides anti-jamming nulls that are wide in the spectral domain and narrow in the spatial domain, and have a SWAP low enough even for drones, addressing the shortcomings of prior anti-jamming systems.

SUMMARY OF THE INVENTION

The present invention relates to autonomous or remote-controlled vehicles having anti-jamming systems for isolation of radio frequency (RF) signals of interest (SOI) from interference (hereinafter "jamming") by selective cancellation, and, more specifically adjusting Time Difference of Arrival (TDOA) of antenna signals at a signal combiner for adjusting cancellation bandwidth.

In one embodiment, the anti-jamming antenna system is of symmetric design in which a first antenna is connected to the first input of a combiner via a signal path comprising a controllable delay element and a phase rotator connected in series between the first antenna and the combiner, and at least one second antenna is connected to a second input of the combiner via a signal path comprising a controllable delay element and a phase rotator connected to series between the second antenna and the combiner. A power detector is connected between the output of combiner and the system controller, to the first signal path and the second signal path. The method comprises rotating phase according to the method described in U.S. Pat. No. 9,519,062, which is incorporated herein by reference in its entirety, together with setting TDOA according to a desired or predetermined cancellation bandwidth.

In another embodiment, the system comprises an asymmetric design in which the at least one second signal path differs from first signal path with respect to one or more of the components and/or propagation time.

In a third embodiment, the system comprises a plurality of stages in one embodiment comprising a first canceller and a second canceller, the outputs of which are connected to a third canceller in a cascade like design for providing additional cancellation of a first jammer or cancellation of a second jammer. This system is operable to be extended to additional stages for cancellation of a plurality of jammers.

In a fourth embodiment, the system comprises a cancellation bandwidth adjustable controlled radiation pattern array (CRPA) in which each signal path has a controllable delay element connected in series with a transversal filter that is further connected to the combiner. In some cases, a third signal path comprises a controllable switch for reversible interruption of propagation of a signal to the combiner.

In a fifth embodiment, the system comprises an asymmetric design wherein an adjustable delay element is used to reduce TDOA and a phase rotator is used to adjust phase-alignment of signals at the combiner. The intrinsic delay induced by delay element and phase rotator is at least one partly matched by a fixed delay element. In some cases, a signal inverter is incorporated in either signal path to provide an initial antiphase alignment.

In addition to control of amplitude and phase as disclosed in referenced patents, e.g., U.S. Pat. No. 9,519,062, the current disclosure teaches control of spectral bandwidth, or cancellation Band Width (CBW), by precise feed-forward control of time difference of arrival (TDOA) at the system combiner. For example, TDOA might be adjusted to some 800 picoseconds to provide a narrow CBW, e.g., 2 MHz, while at TDOA of 80 picoseconds would provide a 20 MHz CBW or an 8 picosecond TDOA would provide a 200 MHz CBW.

In some cases, TDOA control can be conducted for the modified CRPA antennas described herein, finding jammer direction, e.g., using two antenna signals according to U.S. Pat. No. 8,965,319 with that direction being used along with the spatial separations of the array to determine the adjustments of arrival times among the antennas to yield the desired CBW. In some cases, the method is used to form a null that is deeper and/or wider. In this way, the disclosed method can eliminate the need to solve for weightings of the multiple taps in each transversal filter, allowing instead the use of a single I/Q circuit in each signal path, greatly reducing computational demand and SWAP while improving protection against jamming.

These and other aspects of the present invention will become apparent to those skilled in the art after a reading of the following description and figures elucidating the invention.

DETAILED DESCRIPTION

The term drone is used here to describe any unmanned vehicle, including quadcopters ballistic projectiles and remotely piloted vehicles. Although described in terms of drones, drone guns and GPS, this disclosure is intended cover piloted vehicles, as well as reception of any type of RF signal.

Homing is defined as navigating towards a source of interference signals or jamming. Interdiction encompasses any device or method that reduces the effectiveness or operability of a source of jamming. Navigation aiding signals include GPS and other satellite signals, command and control signals, emissions from radio towers or RF beacons, or other wireless signals, among others.

Figures 1A, 1B:
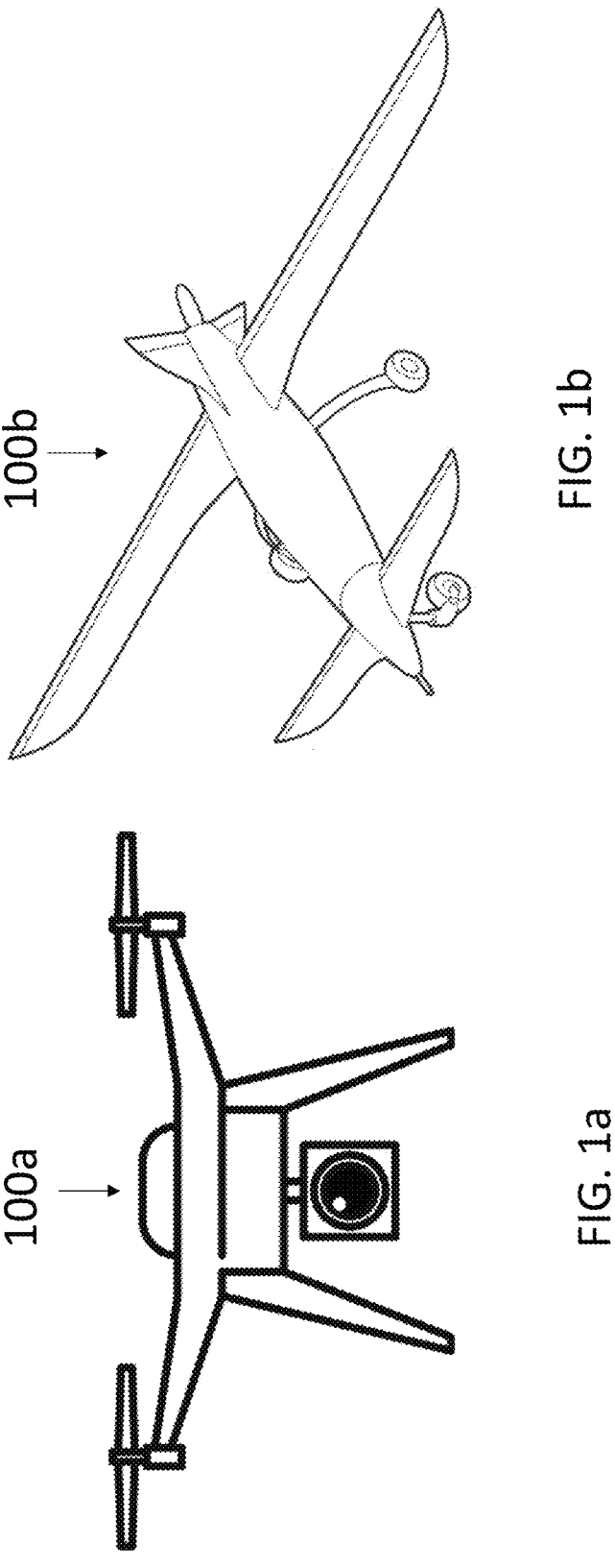
FIG. 1a illustrates a rotary-wing unmanned vehicle comprising a multi-purpose navigation system
FIG. 1b illustrates a fixed-wing unmanned vehicle comprising a multi-purpose navigation system.

FIGS. 1a and 1b depict quadcopter 100a and fixed wing 100b type unmanned vehicles which include a navigation system. Such vehicles in many cases require but do not have anti-jamming capabilities which typically include an adaptive antenna array and a controller, the controller operative to control the array to protect reception of guidance and navigation signals such as in the GPS and ISM bands, among others. In some cases, the controller also serves as a guidance, navigation and control (GNC) unit directing the transit of the vehicle. The navigation system may include, or be connected to, an interdiction unit such as an explosive device or an RF emitter that is operable to be activated by the controller.

The antenna and its method of jammer cancellation and direction finding are as described in U.S. Pat. No. 9,519,062, U.S. patent application Ser. No. 18/222,184 and U.S. Provisional Patent Application No. 63/447,771, each of which is incorporated herein by reference in its entirety. Jamming is intended to include any RF signal strong enough to disrupt reception of desirably received navigation, command, control, communications, or other RF signals.

The antenna system is operable to find the direction to a source of interference that could or has disrupted reception of navigation or command and control signals. The GNC is any type that is operable to switch between navigating a desired course and homing at a source of jamming according to direction finding signals from the antenna system. Switching between mission-defined navigation and homing towards a source is operable to occur when commanded or when jamming exceeds a preset level. Example of interdiction include: colliding with, exploding proximate and emitting electronic attack signals.

Figure 2:
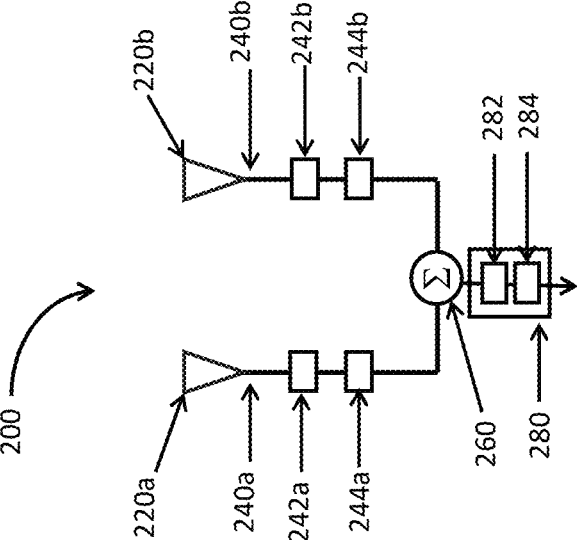
FIG. 2 illustrates a multi-purpose navigation system for canceling jamming signals and interdicting their source

FIG. 2 is a block diagram of one embodiment of the antenna system 200, comprising a first antenna 220a connected to a combiner 260 by a first signal path 240a and a second antenna 220b connected to the combiner 260 by a second signal path 240b. The first signal path 240a integrates a tunable delay element 242a and a phase rotator 244a. The second signal path 240b comprises a delay element 242b and, in some cases, a phase rotator 244b. Rotator 224b, 244b can be of any type providing phase inversion with high resolution, examples including an I/Q device or an inverter plus fine resolution phase shifter, which can be of limited range. Examples of an inverter are; inverting amplifier, inverting splitter and appropriately configured 4-port combiner. The combiner 260 is connected to a controller 280 with a power detector 282 connected to a signal processor 284 that is connected in turn to at least one control input of delay element 224a, 242a and/or phase rotator 224b, 244b. The phase rotator 224a, 244a is any type that is operable also to equalize amplitude of the first antenna signal with respect to the second antenna signal. In some cases, the second signal path 240 incorporates a fixed delay element (not shown for clarity) that is operable to at least partly offset the intrinsic delay of the first antenna signal induced by the controllable delay element 222a or phase rotator 224a and not offset by other delays in the second signal path 240b.

The controller 280 is any type that is operable to calculate anti-phase alignment of the first antenna signal with the second antenna signal at the combiner as means of finding direction to a source of jamming. The controller 280 is any type that can issue commands to alter at least one of time delay and phase rotation as means of controlling navigation of the vehicle 100 with respect to source of jamming, analogous to a plane being navigated relative to a VORT-ACs, or to conduct homing navigation as part of engaging the source of jamming.

Figure 3:
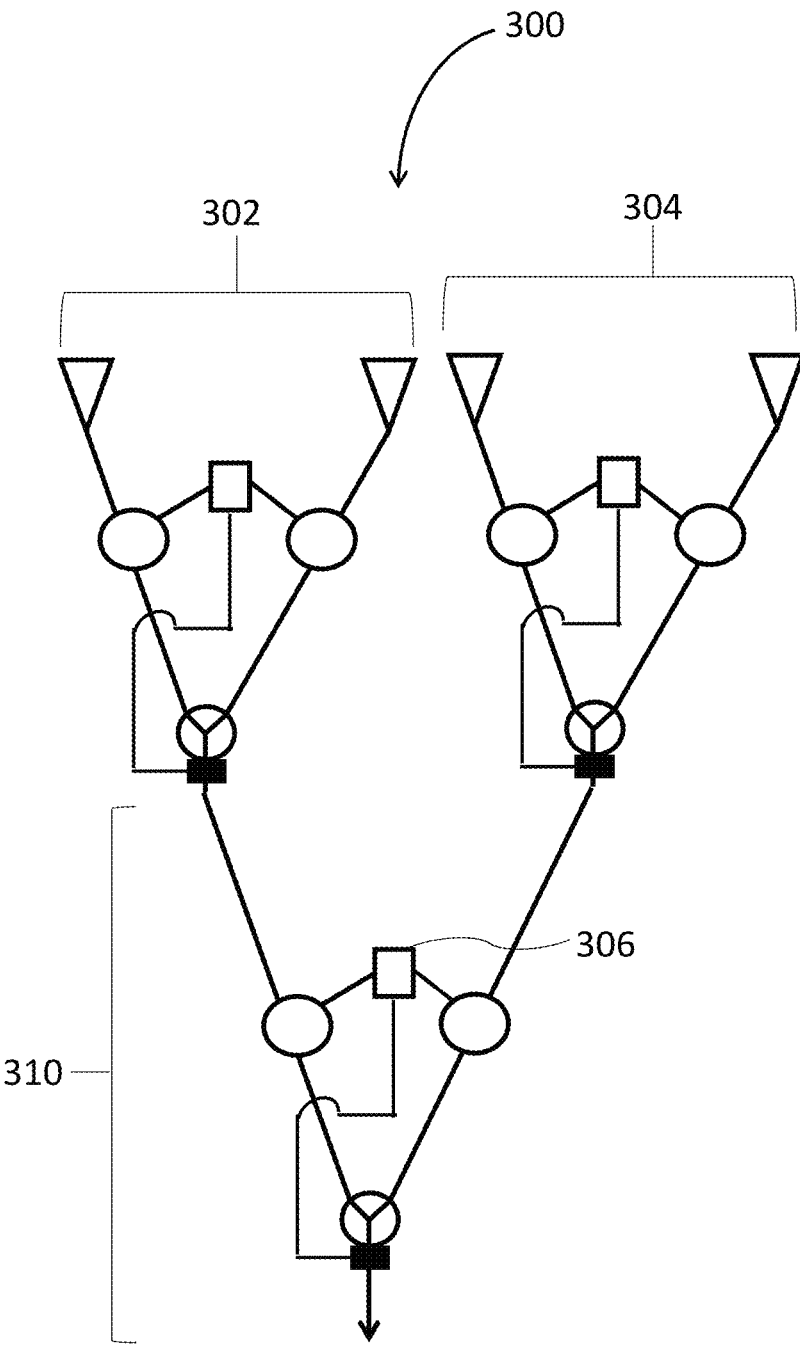
FIG. 3 illustrates a multi-purpose navigation system for multiple canceling of jamming signals and interdicting one source of such signals.

FIG. 3 depicts a two-stage anti-jamming antenna system 300, the second stage 310 operative to provide additional cancellation of a jammer 302 or to provide cancellation of a different jammer 304. As an example of canceling two different jammers, the first stage could cancel Wi-Fi jamming and the second stage could cancel GPS jamming. The controller 306 is any type that is operable to be programmed to switch to homing against a predetermined type of jamming, e.g., Wi-Fi or GPS.

Figure 4A:
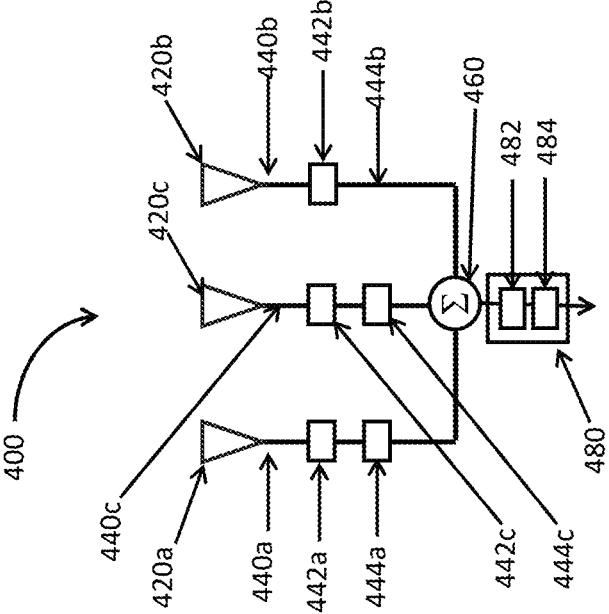
FIG. 4a illustrates a cancellation bandwidth tunable array antenna system.

FIG. 4a depicts an antenna system 400 providing better performance and lower SWAP that the CRPA antennas in use today. This system 400 incorporates any number of antennas between 3 and 33 although only three are depicted here for clarity. Antennas, 420a, 420b, 420c, are each connected to the system combiner 460 via their respective signals paths, 440a, 440b, 440c, at least one of which can comprise a signal inverter element. The output of combiner 460 is connected to a controller 480 comprising a power detector 482 connected to a signal processor 484. In many cases, each signal paths 440a, 440b, 440c incorporates a delay element 442a, 442b, 442c connected between their respective antennas 420a, 420b, 420c and the combiner 460. The signal processor 484 is connected to the control inputs of at least one delay elements 442a, 442b, 442c and/or of at least one phase rotators 444a, 444b, 444c.

These signal paths 440a, 440b, 440c differ from those of a traditional CRPA in having a single delay element and a one phase rotator vs. incorporating multi-tap/multi-weighted transversal filters, resulting in a substantial reduction in computation and SWAP while improving performance.

The processor 484 is any type that can execute a statistical signal processing or other type of control algorithm to provide control signals to adjust the magnitude of delay or phase rotation of antenna signals. Example methods include space-adaptive or space-time-adaptive among others, such as disclosed in U.S. Patent Application No. 63/447,771 which assigned to the assignee of the current invention and is incorporated herein in its entirety by reference.

Figure 4B:
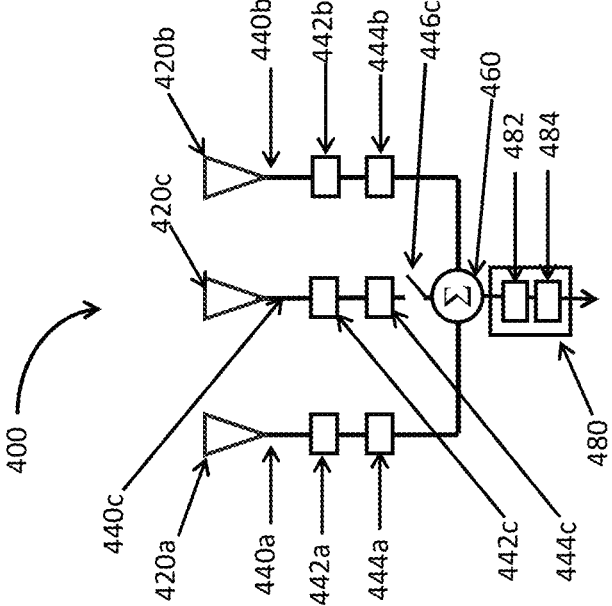
FIG. 4b illustrates a cancellation bandwidth tunable CRPA type antenna array

FIG. 4b depicts an enhanced CRPA type antenna system 400 in which each signal path 440a, 440b, 440c comprises a controllable delay element 442a, 442b, 442c connected between the antenna 402a, 420b and 420c and the combiner 460. Delay element 442a, 442b, 442c is any type that can be adjusted by the controller 480 to set the difference in times of arrival among the antenna signals at the combiner 460 with the effect of setting the frequency bandwidth of cancellation (CBW) as means of matching CBW to the width of a jammer signal or a desirably received signal to improve the signal to noise ratio of wideband signals. A signal path 440a, 440b, 440c comprises a phase rotator 444a, 444b, 444c connected ahead of the combiner 460. In some cases, transversal filters are substituted for the phase rotators 444a, 444b, 444c as means of adjusting phase and amplitude.

FIG. 4b depicts an antenna system 400 in which the at least one third antenna signal path 440c incorporates a switch 446 operative to controllably interrupt propagation of third antenna signals to the combiner 460 so only signals from the first antenna 420a and the second antenna 420b are combined by the combiner 460 with measurement of the combiner output signals being used to determine jammer direction which is used together with the geometry of the array to determine the magnitudes of delay required to minimize time difference of arrival among the various antenna signals as means of controlling cancellation bandwidth. It will be appreciated that determining jammer direction and calculating delay adjustments therefrom can substantially reduce the amount of computation required to converge on an anti-jamming solution.

Figure 5:
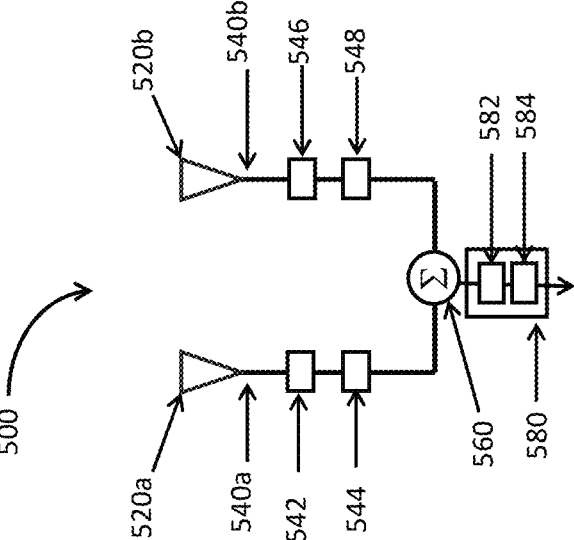
FIG. 5 illustrates an embodiment of the GADm module.

FIG. 5 depicts another embodiment of the GADm module 500 comprising a first antenna 520a and a second antenna 520b each connected to a combiner 560 via their respective signal paths 540a, 540b, the combiner being further connected to a controller 580. First signal path 540a integrates an adjustable delay element 542 and a phaser rotator 544 of any type between the antenna 520a and the combiner 560; the second signal path 540b comprises a signal inverter 546 and a fixed delay element 548 that substantially matches the intrinsic delay, vs the controllable delay, induced by components of the first signal path 540a. The tunable delay element 542 and phase rotator 544 are connected to the controller 580 comprising a power detector 582 connected to a signal processor 584.

The system processor 584 is any type that is operable to determine current direction to a jammer source by processing signals from the combiner 560. The processor 584 is operable to assess current location of the vehicle relative to a desired location or track and, as appropriate, issues updates to vehicle control element to improve navigation. In some cases, the processor is connected to an inertial measurement unit or system (not shown) that is operable to estimate current position from GPS and/or prior location data. In one embodiment, a GPS processor die (not shown) is integrated into the GADm module.

A method of the invention comprises sequential steps of: receiving navigation signals, guiding a vehicle, detecting jamming, mitigating jamming, finding the direction to the source of jamming, navigating with respect to that source. Navigating with respect to that source includes homing on and interdicting it by kinetic or other means. The method includes self-destruction of the system or vehicle when the battery is nearly exhausted, unless over overridden by a command from the user.

In some cases, the controller is operable to steer a drone towards or away from a jammer source by maneuvering to minimize or maximize combiner output power. The method herein includes navigating in another direction using the source of jamming in a manner analogous to the VOR transmitters used in navigation by aircraft pilots. The method includes providing position or other data to another vehicle or weapon, for example on unjammed frequency, to assist its navigation in the face of jamming, for example directing it to engage an adversary unit. The method is operable to determine jamming direction by adjusting tunable delay to substantially reduce the time difference of arrival of antenna signals at the combiner as an indicator of jammer bearing, as commonly practiced in array antenna steering.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A vehicle having a system for navigating with respect to at least one of navigation-aid signal and jamming thereof, comprising:

an antenna array including a first antenna, a second antenna, and a third antenna, each responsive to jammer burdened navigation signals, the first antenna being connected to a signal combiner via a first signal path, the second antenna also connected via a second signal path, and the third antenna also connected via a third signal path to the signal combiner, the combiner output being connected to a power detector that is also connected to a receiver and to a guidance navigation and control type controller that is further connected to at least one element of the first signal path, the first signal path integrating at least one of a phase rotator and a tunable delay line, the controller being any type that is operable to calculate a delay value of the tunable delay line based on a time difference of arrival (TDOA) among the first signal path, the second signal path, and the third signal path, the controller being any type that is operable to determine at least one vehicle parameter of position, velocity and attitude with respect to at least one of the Earth and a source of jamming, and the controller being any type that is operable to determine direction to a source of jamming and navigate a vehicle in that direction, as means of providing at least one of guided navigation, jammer mitigation, source-relative transit, and target interdiction, wherein the controller is operable to steer the vehicle with respect to the source of jamming by maneuvering to minimize or maximize an output power of the signal combiner.

2. The vehicle having the system of claim 1, in which the second signal path integrates a fixed delay element.

3. The vehicle having the system of claim 1, in which the second signal path integrates a second phase rotator between the second antenna and the combiner.

4. The vehicle having the system of claim 3, in which the first signal path integrates a first attenuator between the first antenna and the first phase rotator and the second signal path integrates a second attenuator between the second antenna and the second phase rotator.

5. The vehicle having the system of claim 1, further comprising a staged type comprising at least 4 antennas connected in pairs to two combiners the outputs of which can be further combined to provide at least one of: further cancelation of a first jammer and cancellation of a second jammer.

6. The vehicle having the system of claim 1, in which the antenna array further comprises at least one third antenna connected to the combiner via an interruptible signal to form an enhanced direction finding CRPA antenna.

7. The vehicle having the system of claim 1, in which source-relative transit is conducted by providing navigation data to a third device of any type that is operable to interdict or navigate with respect to the source of jamming.

8. The vehicle having the system of claim 1, further including at least one drone operable to target and engage the source of jamming based on the determined direction to the source of jamming.

9. The vehicle having the system of claim 8, wherein the source of jamming includes a drone gun.

10. The vehicle having the system of claim 1, further comprising a GPS type processor.

11. A system for navigating with respect to at least one of navigation-aid signal and jamming thereof, comprising:

an antenna array including a first antenna, a second antenna, and a third antenna, each responsive to jammer burdened navigation signals, the first antenna being connected to a signal combiner via a first signal path, the second antenna also connected via a second signal path, and the third antenna also connected via a third signal path to the signal combiner, the combiner output being connected to a power detector that is also connected to a receiver and to a guidance navigation and control type controller that is further connected to at least one element of the first signal path, the first signal path integrating at least one of a phase rotator and a tunable delay line, the controller being any type that is operable to calculate a delay value of the tunable delay line based on a time difference of arrival (TDOA) among the first signal path, the second signal path, and the third signal path, wherein the controller calculates the delay value to adjust the time difference of arrival (TDOA) to achieve a cancellation bandwidth (CBW), the cancellation bandwidth having a width of a jamming signal or a desirable signal;

the controller being any type that is operable to determine at least one vehicle parameter of position, velocity and attitude with respect to at least one of the Earth and a source of jamming, and the controller being any type that is operable to determine direction to a source of jamming and navigate a vehicle in that direction, as means of providing at least one of guided navigation, jammer mitigation, source-relative transit, and target interdiction.

12. The system of claim 11, further comprising a staged type comprising at least 4 antennas connected in pairs to two combiners the outputs of which can be further combined to provide at least one of: further cancelation of a first jammer and cancellation of a second jammer.

13. The system of claim 11, in which the second signal path integrates a fixed delay element.

14. The system of claim 11, in which the second signal path integrates a second phase rotator between the second antenna and the combiner.

\* \* \* \* \*